Patented Mar. 5, 1929.

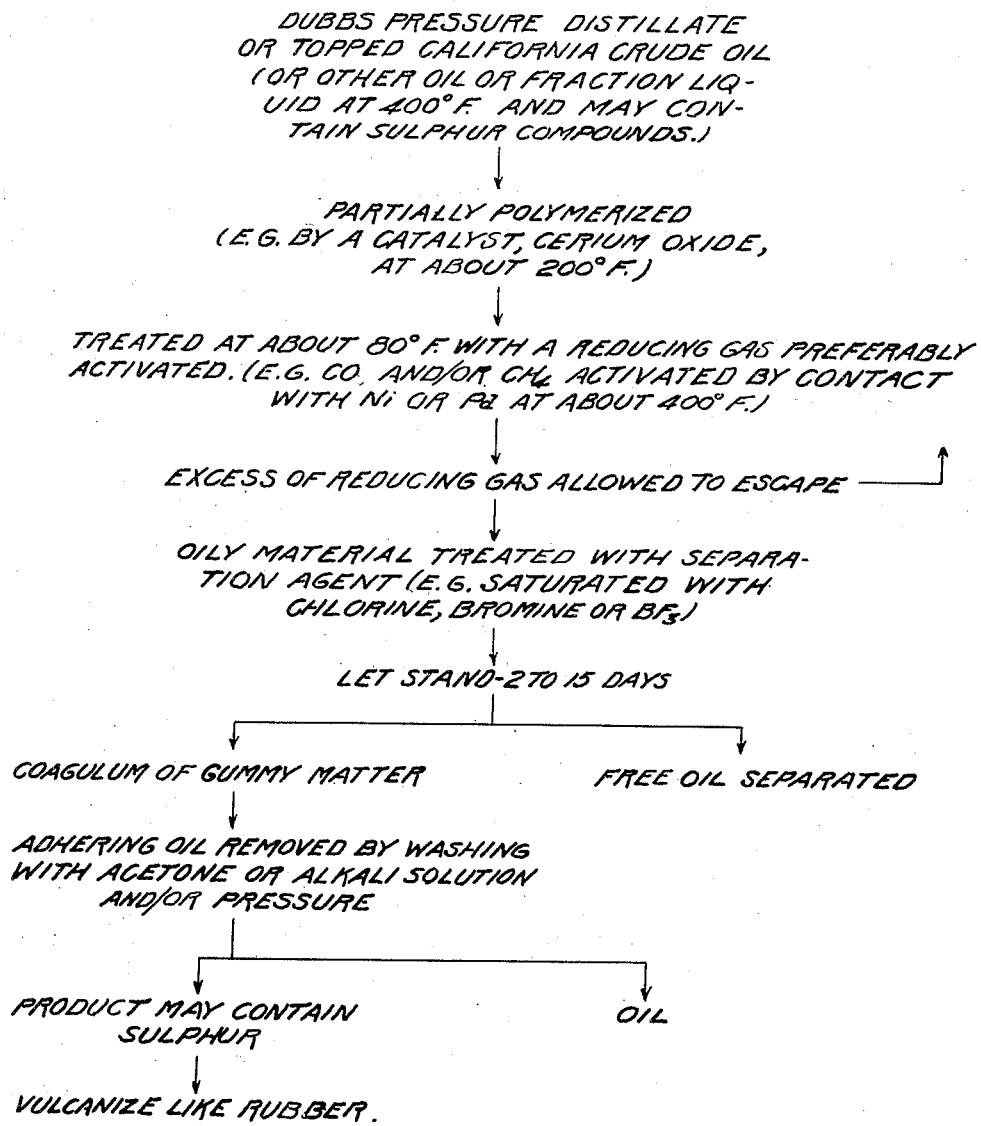

1,704,194

UNITED STATES PATENT OFFICE.

EDGAR W. HULTMAN, OF LOS ANGELES, CALIFORNIA, ASSIGNOR OF ONE-FOURTH TO FRANCIS P. DUNCKLEE, ONE-FOURTH TO JOSEPH MONTELEONE, AND ONE-FOURTH TO WALTER R. SIMONS, ALL OF LOS ANGELES, CALIFORNIA.

RUBBER-LIKE SUBSTANCE AND PROCESS OF OBTAINING THE SAME.

Application filed October 29, 1927. Serial No. 229,682.

As may be inferred from the above title, it is a primary object of this invention to provide substances suitable for vulcanization, to produce solid bodies having various degrees of elasticity; and it is an especial merit of my novel process that it is capable of yielding desirable products, of the general character referred to, from inexpensive hydrocarbon mixtures such as topped or other crude or cracked mineral oils, or from residual or other complex fractions derived therefrom which are preferably substantially free from low-boiling constituents, namely from constituents boiling at up to about 400° F.

My novel processes aim especially to produce liberal quantities of rubber-like precipitates or coagula directly in the presence of comparatively inactive or excess oily constituents of the treated oil mixtures,—thereby obviating expensive initial treatments, for purposes of isolation and/or purification; and it is a great merit of my process that, after subjecting a typical Pacific coast crude, or the like, to sufficient heat to drive off any constituents thereof that can be volatilized below about 400° F. (and preferably exposing the residue to a suitable catalytic, such as is hereinafter described, at about 200° F. for a polymerizing effect) by merely advancing therewith or bubbling therethrough or otherwise contacting therewith a suitably active or activated reducing gas (the oily liquid being then preferably cool and the introduced gas being preferably hot) I am enabled, upon thereafter treating the resultant mixture with a separation producing or oxidation-initiating agent such as a halogen gas, to start a change which results (within a period which seldom need exceed two weeks) in a liberal deposition of the desired rubber-like product. Instead of the Pacific coast crude oil (most of these contain some asphalts), a paraffin base crude, or the combined distillate therefrom up to and including the light lubricating oil, or up to and including the kerosene, can be so treated. The yield of rubbery material will however be rather lower than with the Pacific coast oil.

Other objects of my invention, which should be understood as including not only the mentioned steps and various sub-combinations and/or modifications thereof but also various rubber-like products (which may or may not contain considerable quantities of sulphur, according to the sulphur content of the treated oil or oil fraction) may be best appreciated from the following description of an illustrative embodiment of my invention, taken in connection with the appended claims and accompanying drawings, it being understood that—

The drawing is a mere flow-sheet diagrammatically illustrating a preferred or typical series of steps employed in the production of a rubber-like precipitate or coagulum from a suitable mineral oil residue or other fraction.

Referring to the details of one specific embodiment of my invention chosen for the purpose of illustration, and starting with any suitable crude petroleum or hydrocarbon mixture: unless the same has been naturally or artificially freed from fractions which vaporize below about 400° F., I may remove lighter fractions to substantially the boiling point indicated, thereafter bringing the residue to a temperature of about 200° F. At about this temperature, the mixture of hydrocarbons obtained as above for any similar mixture may be treated, in liquid phase with any suitable quantity of a solid polymerizing catalyst,—about one-half pound of oxide of cerium per barrel of oil having been found suitable for the purpose here referred to. It is believed to be comparatively immaterial whether the treatment here referred to is effected by stirring the catalyst into the mixture or by other usual or special methods of effecting intimate contact.

Assuming this mixture of residual or other suitable hydrocarbon oils with a finely subdivided polymerizing catalyst to be thereafter cooled to approximately 80° F., optionally but not preferably decanting or otherwise removing the mentioned catalyst from the oil, I may next bubble therethrough (or advance therewith or otherwise contact therewith) a suitable quantity of an activated (and usually a hot) reducing gas. As suitable reducing gases I may mention carbon monoxide and/or methane; and the reducing gas or mixture is preferably previously subjected to an activating treatment (that is, to a treatment favorable to its efficiency when so used) by contact with a metallic catalyst—preferably at such an elevated temperature as I suggest below. The reducing gas should be substantially free from carbon dioxide; it may advantageously be activated by exposure to suitably heated (and preferably finely divided or extended) nickel, palladium, or similar metal; and I have obtained highly satisfactory results by the use of a reducing gas, activated in substantially the manner just above suggested, in the proportion of about one cubic foot of the gas per gallon of oil treated,—the oil being initially at about 80° F., the activation being effected at about 400° F., and the activated gas being introduced into the oil while such gas is preferably at an elevated temperature such as 300°–420° F.

The desired temperature may be imparted by heating the catalyst to about 400° F., but temperatures higher than 420° F. should be obviated, at least so long as the apparatus contains any air,—to obviate risk of explosion; and a moderate interval of time (say twenty-four hours) may be permitted to elapse after the introduction of an activated or other reducing gas is discontinued,—in order to permit the escape thereof from the oil mixture before an oxidation or agglomeration or separation of the desired product shall be initiated therein.

At the end of the period last referred to the desired final reaction may be initiated in the described oil mixture, or its equivalent, by substantially saturating the same with a halide or halogen gas, such as boron fluoride, bromine or chlorine,—the latter being ordinarily more available and approximate saturation being inferred by an apparent failure of further absorption; and the oxidation or other reaction so initiated may continue during a time interval amounting to two to fifteen days, when a coagulation and/or precipitation of the desired rubber-like substance may be approximately complete or may reach substantial equilibrium. Throughout the present case the term " halogen gas " is used in the sense stated in this paragraph.

This substance, which may be referred to as the primary objective of the described series of steps, may contain a percentage of sulphur dependent upon the composition of the treated oil, and it may be subjected to any suitable chemical and/or mechanical manipulation, to remove oil therefrom before it is vulcanized or utilized in substantially the same manner as natural rubber, or otherwise.

Acetone or an aqueous solution of an alkali may be employed in removing oil,—either before, during or after an application of pressure or other mechanical working of the precipitate or coagulum; and, in case the sulphur content thereof is appreciable, a corresponding allowance may be made, in reduction of the quantity of sulphur, or its equivalent, subsequently introduced for a vulcanizing or other effect.

The oils thus far available to my use having been, in general, asphaltic-base oils containing appreciable sulphur. I am at present unable to state what constituents thereof are most important, and I have not herein considered it necessary to attempt precise statements of any of the reactions involved or any theories in relation thereto; but, in connection with the foregoing, I may mention that I find it distinctly advantageous to subject high-boiling hydrocarbon mixtures, of the general character described, to a preliminary polymerization by means of solid or other non-miscible catalysts (such as the mentioned cerium oxide or a tin oxide) and advantageous also to activate my reducing gas or mixture by contacting the same with a suitable hot metal.

The exact proportions of the catalytic, reducing and halogenating or oxidizing or separation-initiating materials herein referred to appear to be of less practical importance than the temperature relations above mentioned; and I indeed find that, with a given oil, the optimum temperature range for the activation of the reducing gas or gases may be very narrow. For example, when working with a specific pressure distillate from an unrefined Dubbs cracking plant (from a California asphaltic crude containing about 1.5% of sulphur), I have found it best to activate the reducing gases at between 390° F. and 410° F.—or even within a closer range ascertained by preliminary control experiments,—a yield of some 20 grams, more or less, of the desired rubber-like product per 100 grams of treated oil being frequently obtainable after substantial saturation with chlorine and standing for some two to fifteen days at ordinary temperatures.

As a specific illustration: some 2000 parts of a neutral pressure distillate produced from a Dubbs cracking unit and having a gravity of about 53.2 Bé. was placed in a copper still, the light oils, volatile under about 400° F., being removed therefrom during a period of approximately two hours. The oil then remaining in the still (comprising about 20% by volume of the original charge) was cooled to about 200° F., at which point cerium oxide was introduced at the rate of about 1 gram of the oxide to each 400 c. c. of the mentioned residue, the mixture being agitated for a few minutes at said temperature.

A darkening in the color of the resultant oil mixture was observed; and it was permitted to cool to about 80° F. A gaseous mixture containing approximately 90% of carbon monoxide and approximately 10% of methane was then passed thru a container approximately filled with a catalytic activating mass in the form of fused magnesium sulphate thruout which was distributed finely divided metallic nickel (amounting to of about 1½% of the mass) and a trace of palladium, (said catalytic mass being held at about 400° F.), the reducing gas so activated being passed, at about 400° F., directly into and being caused to bubble through the oil mixture, including cerium oxide, and the activated reducing gas mixture being used in the proportion of about .2 cubic ft. to 400 c. c. of the oil mixture,—which was then set aside for about 24 hours.

At the expiration of the period last referred to, chlorin gas was passed thru the oil mixture to saturation; and it was then set aside for a further period of about five days. It was observed that during this last period, the oil seemed to thicken up; and, by the fifth day, a well defined dark brown coagulum had formed. Upon a completion of the separation of the coagulum from the remaining oil, first by decantation and then by repeated manipulation with acetone, a sticky substance amounting to about 60 parts by volume per 400 parts of the treated oil residue was obtained; and this sticky substance was found to be susceptible of vulcanization, and to possess usual properties of rubber.

The foregoing is based upon laboratory experience; and the percentage composition of a vulcanizable product obtained as above is indicated by the following analysis:—

|  | Per cent. |
|---|---|
| Total rubber hydrocarbon | 76.5 |
| Total sulphur | 7.6 |
| Oils and resins extracted by acetone | 7.9 |
| Additional resins extracted by chloroform | 7.9 |
| Cerium oxide, etc | .1 |
|  | 100.00 |

In connection with the foregoing it should be understood not only that various features of my invention may be independently employed, and that numerous modifications of the described technique might easily be devised by workers skilled in the arts to which this case relates (without involving the slightest departure from the spirit or scope of my invention) but also that the described product is suitable for utilization either in substantially the same manner as natural rubber or in other and peculiarly advantageous ways, the latter being immaterial to my present invention.

The term "cooling" as employed in the appended claims is intended to cover both natural and artificial cooling. Thus by allowing a batch of the oil to stand unprotected it will cool naturally, this being slow. If rapid cooling is desired, cold water or other cooling liquids can be passed through jackets, coils, etc., in proximity to the oil, all as well known in the art.

I claim as my invention:

1. In the preparation of a rubber-like substance: contacting a liquid mineral oil material, substantially free from constituents which boil at temperatures substantially below 400° F., with a polymerizing agent of the class including cerium and tin oxides at substantially below 400° F., then substantially cooling and treating with an activated reducing gas at a temperature below that used in the polymerizing operation, subjecting to a halogenating reagent of the class including chlorine, bromine and boron fluoride, to produce a soft rubbery product in the resulting oily material, and separating it from the bulk of the oily material.

2. A process of the general character defined in claim 1, in which said mineral oil material contains sulphur compounds.

3. A process of the general character defined in claim 1, in which the rubbery product obtained is purified by an oil-remover in which said product is substantially insoluble.

4. A process of treating a cracked oil of the general nature of a Dubbs pressure distillate, which comprises removing such portions as are volatile at about 400° F., adding to the residual oil, while in a liquid state and at about 200° F., a polymerizing catalyst having the polymerizing properties of cerium oxide and tin oxide, cooling the oil material to about 80° F., passing a reducing gas having the properties of carbon monoxide, methane and mixtures thereof, in contact with a catalyst having the catalytic properties of nickel and palladium, at about 400° F., and contacting the so-treated gas with the oil, thereafter treating the oil with a halogen reagent having the coagulation-inducing action of chlorine, bromine and boron fluoride, permitting the so-treated oil to stand for several days until a soft rubbery product is produced in the oil and separating the latter from the oil.

5. In making rubbery material a process of polymerizing liquid hydrocarbon petroleum distillates, by treating the same in a liquid state with a small percentage of cerium oxide at about 200° F.

6. In the production of a rubber substitute, the herein described process which comprises first heating mineral oil material to a temperature of about 400° F., to liberate and drive off constituents volatile at said temperature, then treating the residual oil in a liquid state, with a solid oxid polymerizing catalyst of the class including cerium oxide and tin oxide, at not substantially below 200° F., for polymerizing, then substantially cooling the oil and treating it with an activated reducing gas, and subsequently treating the said oil with a gaseous halogen reagent of the class composed of halogen elements and halide of boron, and allowing a coagulum of somewhat rubbery nature to form in the oil, and separating the coagulum from the bulk of the remaining oil.

7. In the production of a rubber substitute, the herein described process which comprises first heating mineral oil material to a temperature of about 400° F., to liberate and drive off constituents volatile at said temperature, then treating the residual oil in a liquid state, with a solid oxid polymerizing catalyst of the class including cerium oxide and tin oxide at not substantially below 200° F., for polymerizing, then substantially cooling the oil and treating it with a reducing gas that has been activated by passage in contact with a catalyst of the nickel-palladium group, and subsequently treating the said oil with a gaseous halogen reagent of the class composed of halogen elements and halide of boron, and allowing a coagulum of somewhat rubbery nature to form in the oil, and separating the coagulum from the bulk of the remaining oil.

8. In the production of a rubber substitute, the herein described process which comprises first heating mineral oil material to a temperature of about 400° F., to liberate and drive off constituents volatile at said temperature, then treating the residual oil in a liquid state, with a solid oxid polymerizing catalyst at not substantially below 200° F., for polymerizing, then substantially cooling the oil and treating it with an activated reducing gas, and subsequently treating the said oil while still carrying some of the polymerizing catalyst with a gaseous halogen reagent of the class composed of halogen elements and halide of boron, and allowing a coagulum of somewhat rubbery nature to form in the oil, and separating the coagulum from the bulk of the remaining oil.

9. In the production of a rubber substitute, the herein described process which comprises first heating mineral oil material to a temperature of about 400° F., to liberate and drive off constituents volatile at said temperature, then treating the residual oil in a liquid state, with a solid oxid polymerizing catalyst at not substantially below 200° F., for polymerizing, then substantially cooling the oil and treating it with an activated reducing gas, and subsequently bringing a halogen-containing agent having the properties of free chlorine, free bromine and boron fluoride, at substantially below 200° F., into contact with such oil, and allowing a coagulum of somewhat rubbery nature to form in the oil, and separating the coagulum from the bulk of the remaining oil.

10. In the production of a rubber substitute, the herein described process which comprises first heating pressure-cracked and pressure-distilled mineral oil material in a liquid state, to a temperature of about 400° F., to liberate and drive off constituents volatile at said temperature, then subjecting the residual oil to a polymerizing process at a lower temperature but at above ordinary room temperature in the presence of a catalyst having the polymerizing properties of cerium oxide and tin oxide, then substantially cooling and treating with a reducing gas which has been contacted with a catalyst of the nickel-palladium type at about 400° F., subsequently treating the said oil in a liquid state with chlorine, and allowing a coagulum resembling soft rubber to form in the oil, and separating the coagulum from the bulk of the remaining oil.

11. In the production of a rubber substitute, the herein described process which comprises first heating liquid cracked mineral oil distillate to a temperature sufficient to liberate and drive off constituents volatile at about 400° F., then subjecting the residual oil to a polymerizing process in the presence of cerium oxide at about 200° F., then cooling the oily material to about 80° F., and treating same with a hot activated reducing gas, and subsequently passing chlorine into the said oil, and allowing a coagulum of soft gummy material of rubbery nature to form in the oil, and separating the coagulum from the bulk of the remaining oil.

12. In the production of a rubber substitute, the herein described process which comprises first heating liquid mineral oil material only to a temperature of about 400° F., to liberate and drive off constituents volatile at said temperature, then subjecting the residual oil to a polymerizing process at a temperature substantially below 400° F., then further cooling the oil and treating with an activated reducing gas of the class including methane and carbon monoxide, and subsequently treating said oil with a halogen-containing separating agent of the class comprehending chlorine, bromine and boron fluoride, and allowing a coagulum of soft rubbery consistency to form in the oil, and separating the coagulum from the bulk of the remaining oil.

13. In the production of a rubbery material from liquid mineral oil material, the herein described improvement which comprises the steps of activating a gas by passing a reducing gas of the class including carbon monoxide and methane, in contact with a catalyst of the class including nickel and palladium at about 400° F., and contacting such activated gas with a polymerized mineral oil material at summer atmospheric temperature.

14. As a new product, a rubber-like mass having in general the properties of the rubbery mass produced by successively contacting a liquid mineral oil material, polymerized by treatment in a liquid state with a polymerizing agent of the class consisting of cerium oxide and tin oxide, with an activated reducing gas, and with a halogen separation agent of the class including chlorine, bromine, and boron fluoride.

15. As a new product, a rubber-like mass having in general the properties of the rubbery mass produced by successively contacting a sulphur-bearing liquid mineral oil material, polymerized by treatment in a liquid state with a polymerizing agent of the class consisting of cerium oxide and tin oxide, with an activated reducing gas, and with a halogen separation agent of the class including chlorine, bromine and boron fluoride, such rubber-like mass also containing sulphur derived from said mineral oil.

16. In making rubbery material, the improvement which comprises polymerizing liquid petroleum hydrocarbon products, which boil at above 400° F., by treating such products in a liquid state, and at below its boiling point with cerium oxide, followed by treatment with an activated reducing gas at a lower temperature.

In witness whereof, I have hereunto affixed my signature.

EDGAR W. HULTMAN.